United States Patent [19]
Poole et al.

[11] Patent Number: 5,421,999
[45] Date of Patent: Jun. 6, 1995

[54] FLOATING NITRIFICATION REACTOR IN A TREATMENT POND

[75] Inventors: Warren D. Poole, St. Paul; David J. Burton, Woodbury, both of Minn.

[73] Assignee: The Lemna Corporation, Mendota Heights, Minn.

[21] Appl. No.: 279,696

[22] Filed: Jul. 25, 1994

Related U.S. Application Data

[63] Continuation of Ser. No. 945,738, Sep. 16, 1992, abandoned.

[51] Int. Cl.$^6$ .............................................. C02F 3/06
[52] U.S. Cl. ..................................... 210/150; 210/170; 210/242.2
[58] Field of Search .................. 210/602, 615–617, 210/747, 150, 151, 170, 220, 242.1, 242.2; 47/59, 62, 63

[56] References Cited

U.S. PATENT DOCUMENTS

| | | | |
|---|---|---|---|
| 3,235,234 | 2/1966 | Beaudoin | 210/242.2 |
| 5,096,577 | 3/1992 | Ngo et al. | 210/151 |
| 5,122,266 | 6/1992 | Kent | 210/150 |
| 5,228,998 | 7/1993 | DiClemente et al. | 210/242.2 |

OTHER PUBLICATIONS

"Boosting Pond Performance With Aquaculture", by Viet Ngo, Operations Forum, vol. 4, No. 8, Aug. 1987, p. 20.
BIOdek Biological Wastewater Treatment Media, Munters.
Captor Hi-Rate Nitrification, Ashbrook-Simon-Hartley.
"Ammonia Nitrogen Removal In Attached-Growth Ponds", by H. K. Shin and Chongrak Polprasert, Journal of Environmental Engineering, vol. 114, No. 4, Aug. 1988.

Primary Examiner—Thomas Wyse
Attorney, Agent, or Firm—Kinney & Lange

[57] ABSTRACT

A floating nitrification reactor for use in a treatment pond utilizes a mass of high surface area material which provides sites for bacterial treatment. Floatation devices are attached to the mass of high surface area material in order to float the material at neutral buoyancy while an isolator surrounds the material and isolates the material from the rest of the treatment pond. An aerator, located a distance below the mass of high surface area material, forces air and water through the material at a sufficient speed to allow treatment.

25 Claims, 7 Drawing Sheets

# FLOATING NITRIFICATION REACTOR IN A TREATMENT POND

This is a continuation of application Ser. No. 07/945,738, filed Sep. 16, 1992, now abandoned.

INCORPORATED BY REFERENCE

This application incorporates by reference U.S. Pat. No. 5,096,577 entitled FLOATING AQUATIC PLANT WATER TREATMENT SYSTEM which was invented by Ngo et al. and is assigned to the Lemna Corporation, who is also the assignee of the present application.

BACKGROUND OF THE INVENTION

The present invention relates to a biomass producing system and in particular to a floating nitrification reactor in a treatment system.

For many years, fixed film reactors, or trickle filters, have been a widely applied method for the biological oxidation of organic waste. Biologic growths on the reactor's surface converts dissolved organic waste material or ammonia nitrogen into stable byproducts including carbon dioxide, nitrates, nitrites, water, and biological solids. These byproducts are later removed. Thus, the fixed film reactor is a cost efficient method for biochemical oxygen demand (BOD) reduction, nitrification, denitrification, odor scrubbing, and anaerobic treatment.

Nitrification reactors normally consist of a separate structure within the biomass producing system. The nitrification reactor structure is a tall tower of material, such as conventional modular sheet media. The sheet media is housed in a building wherein the sheet media goes from wall-to-wall covering the entire surface area within the building. Some towers reach heights of 50 feet.

For proper nitrification, both air and water must penetrate a given surface of the sheet media. During operation, water is pumped along the outside of the housing to the top of the tower and is then trickled down through the modular sheet media. Thus, wherever water trickles down and comes in contact with both oxygen and the sheet media, the nitrification process occurs.

Because of their size, nitrification towers are very expensive to build and maintain. It is also expensive and inefficient to continuously pump water to the top of the towers, thereby allowing the water to trickle down through the sheet media.

Submerged nitrification reactors have previously been built in the United States. To realize maximum oxidation of organic wastes in a submerged nitrification reactor, a constant air pressure is critical. Constant air pressure within a submerged reactor is obtained when the source of oxygen within the reactor is kept at a constant distance below the water level.

One known submerged nitrification system incorporates a submerged tank into the treatment process. Sheet media within the submerged tank extends from wall-to-wall of the tank for bacterial attachment. Wastewater is channeled into the tank and maintained at a constant level throughout the nitrification process. Air is bubbled-up through the sheet media from aerators or jets affixed to the floor of the tank. Since the water level within the tank remains constant, constant air pressure is maintained. This type of submerged nitrification system requires both a separate tank within the oxidation process and a constant water level within the tank. The maintenance of these requirements are expensive and inefficient.

Another known submerged nitrification system also requires the use of a submerged tank within the treatment process. This system also channels wastewater into the tank and utilizes aerators or jets affixed to the bottom of the tank. However, this system incorporates the use of small sponges or foam-like particles floating about the tank for bacterial attachment. This type of nitrification system, like the previously described system, is both expensive to maintain and inefficient.

The present invention addresses these and other problems related to nitrification reactors in a treatment system.

SUMMARY OF THE INVENTION

A wastewater treatment system for use in a wastewater treatment pond incorporates a channel having an inlet and an outlet for holding wastewater flowing from the inlet to the outlet. A mass of high surface area material within the channel provides sites for bacterial attachment. Floatation devices are attached to the mass of high surface area material in order to float the mass material at neutral buoyancy. The mass material is isolated from the rest of the treatment pond to prevent dilution of the nitrification process. An aerator, located a distance below the mass material, forces air and water through the mass material at sufficient speed to allow bacterial treatment.

DETAILED DESCRIPTION OF THE PREFERRED EMBODIMENTS

Figure 1:
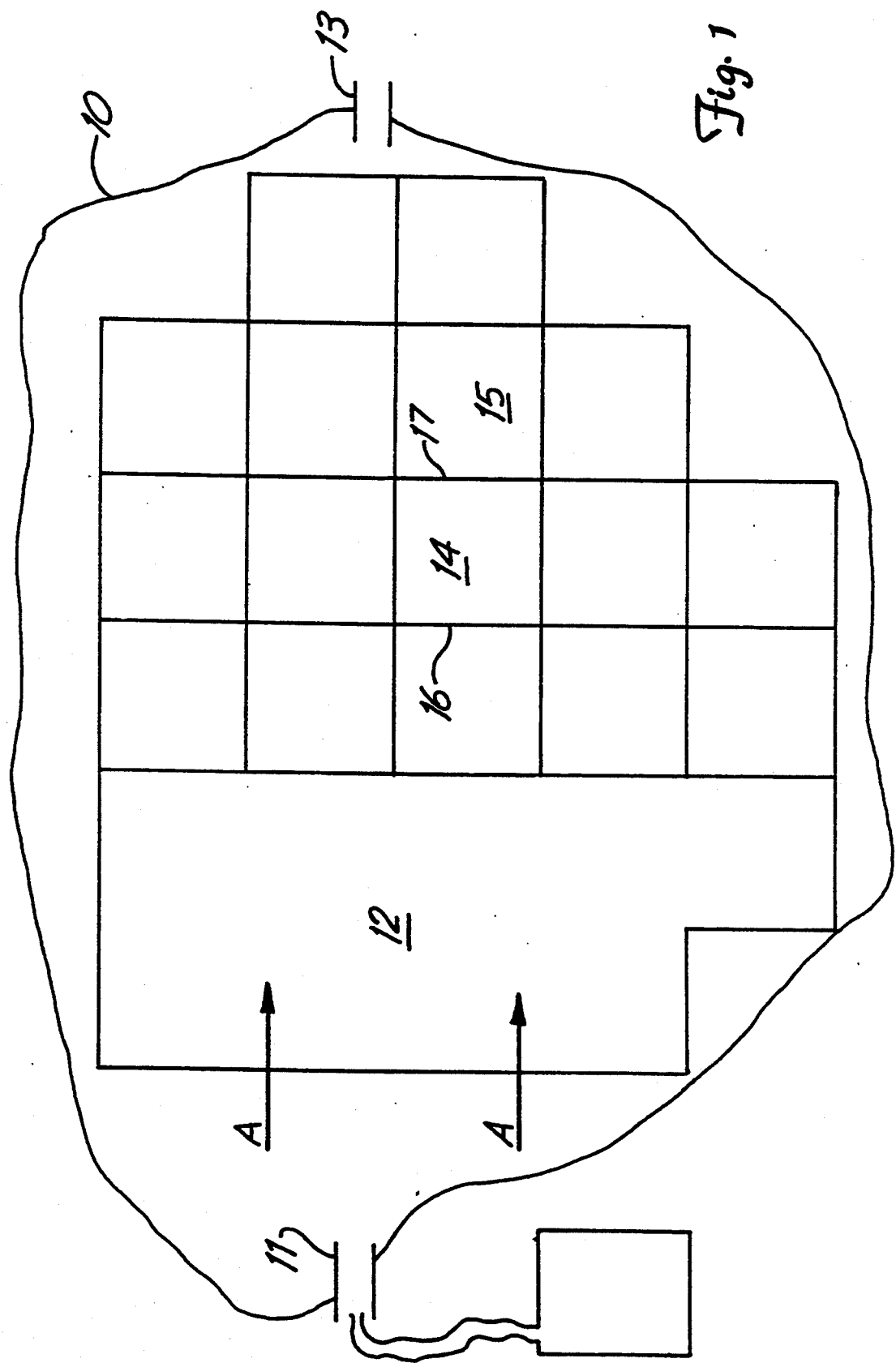
FIG. 1 is a top view of a wastewater treatment pond with a series of isolation baffles.

A top view of wastewater treatment pond 10 is shown generally in FIG. 1. Pre-aeration zone 12 is within pond 10 as is a series of nitrification reactor chambers such as chambers 14 and 15 separated by numerous baffles such as baffles 16 and 17.

Generally, wastewater to be treated flows through inlet 11 into pond 10 in a direction indicated by arrow A of FIG. 1. Wastewater flows across pond 10 first through pre-aeration zone 12 and then through nitrification reactor chambers, such as reactor chambers 14 and 15, where a nitrification process is performed on the wastewater. After treatment, the water exits pond 10 through outlet 13. Gravity provides the force needed to move the wastewater through pond 10. However, where necessary, pumping system 19 can provide this force.

Pre-aeration zone 12 may be necessary to either remove anaerobic conditions which are potentially toxic to nitrifying organisms or to otherwise alter the chemical nature of the wastewater. Baffles 16 and 17 utilize weights to position the baffles on the floor of pond 10 extending to a level above the water level of pond 10. Baffles 16 and 17 are preferably solid baffles with a hole for water flow.

Figure 2:
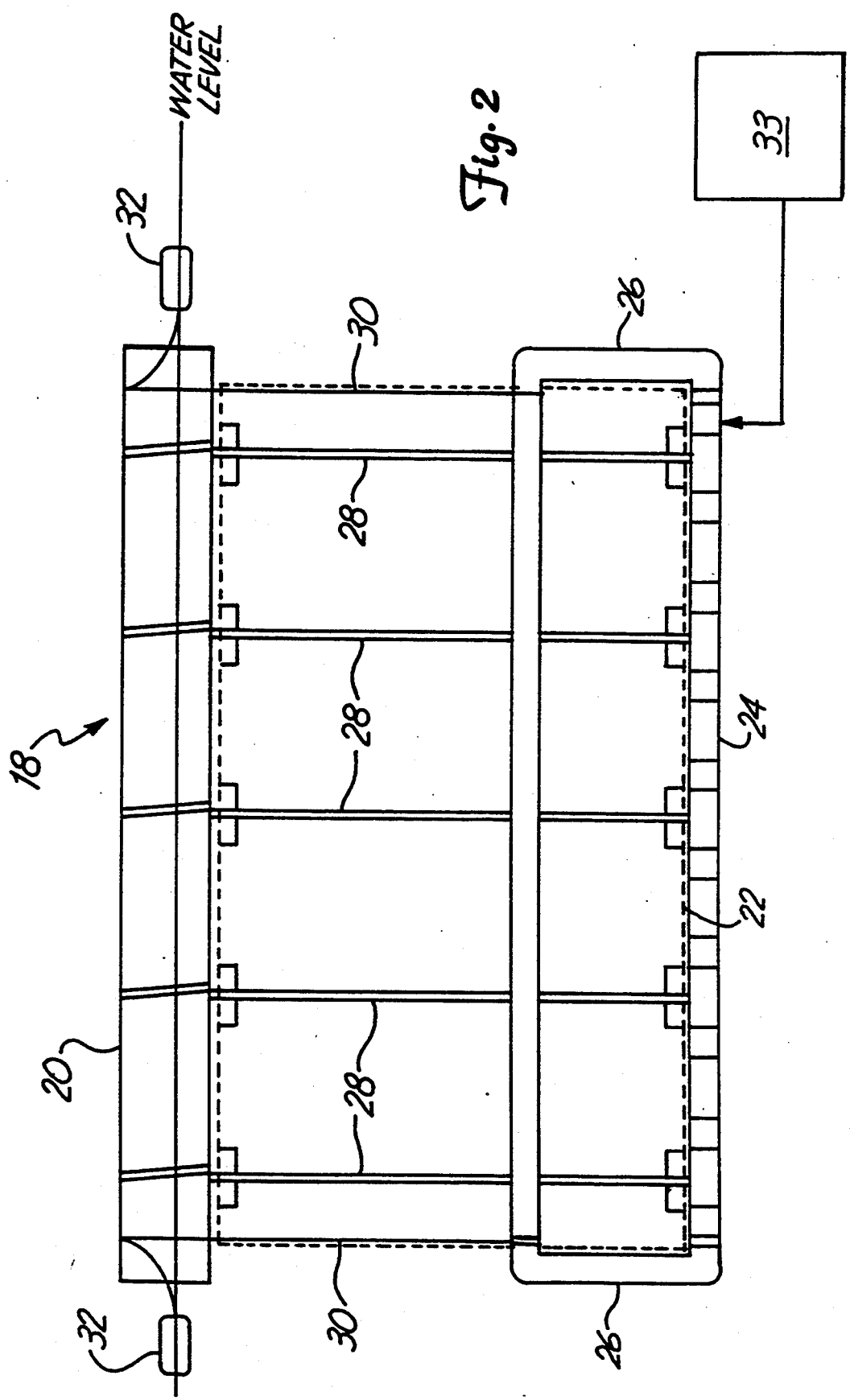
FIG. 2 is a side view of a nitrification reactor.

FIG. 2 is a side view of nitrification reactor 18 which performs the nitrification process on the wastewater in pond 10. One nitrification reactor is normally located in each nitrification reactor chamber. Reactor 18 includes capped pipes 20, mass of high surface area material 22 (represented by the dashed line), aerator 24, aerator supports 26, straps 28, cables 30, floats 32, and pump 33.

Capped pipes 20 and floats 32 serve as float devices to suspend nitrification reactor 18 in treatment pond 10. Thus, the mass of high surface area material 22, which is preferably a trickle filter media, floats at neutral buoyancy within pond 10. Mass material 22 is suspended at a point below the surface of the water in pond 10 so that water can flow both above and below mass material 22 within reactor chamber 14.

Aerator supports 26, straps 28, and cables 30 support aerator 24 and hold aerator 24 at a constant distance below the water level of pond 10. Pump 33 is the air supply for aerator 24.

Figure 3:
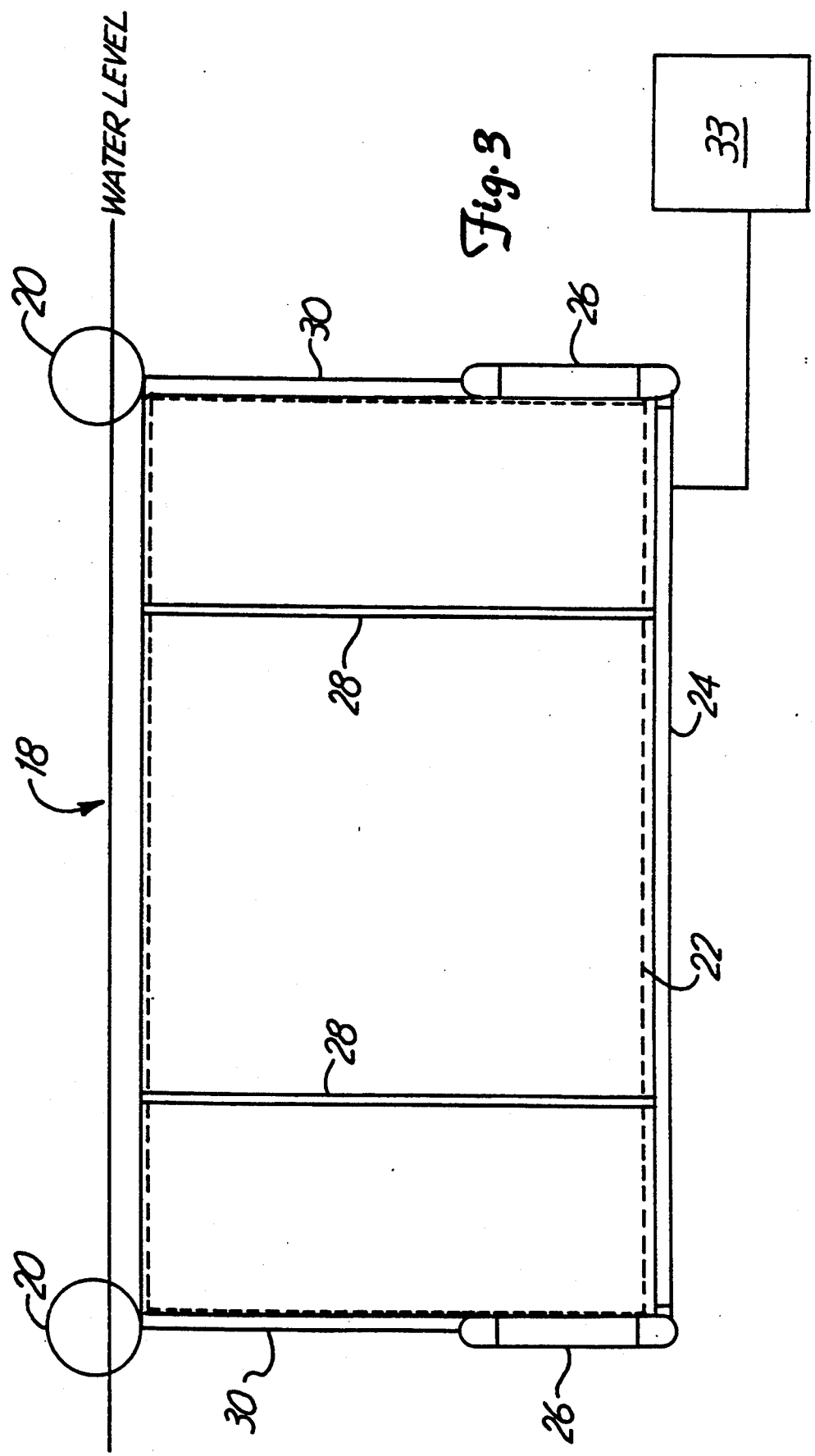
FIG. 3 is a front view of a nitrification reactor.

As shown in FIG. 3, capped pipes 20 are connected on only two sides of reactor 18 at the water level. This permits wastewater to flow over mass material 22 on the remaining two sides and recirculate downwards towards the bottom of reactor 18 after bubbling up through mass material 22.

Figure 4:
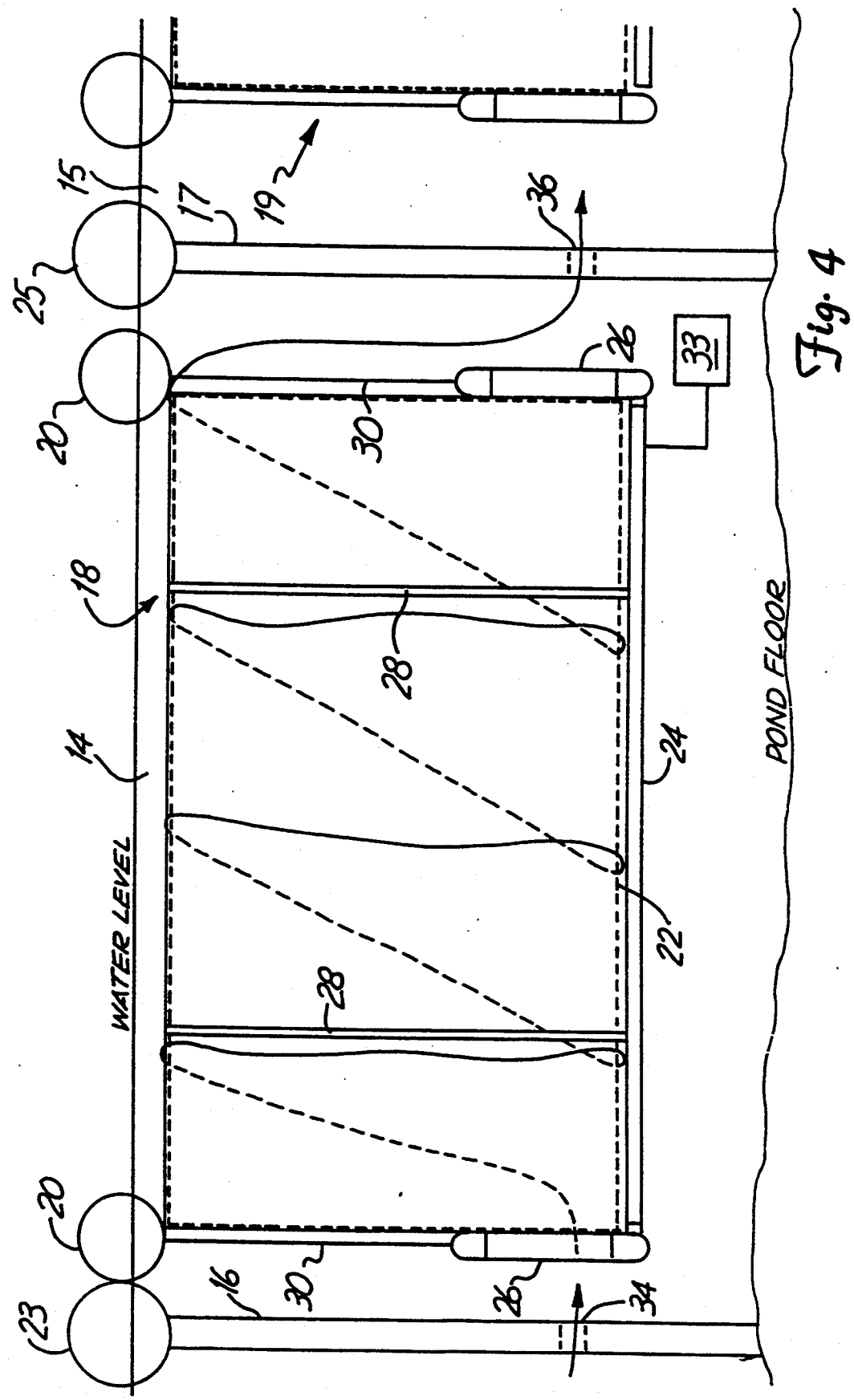
FIG. 4 is a front view of a series of nitrification reactors separated by baffles.

FIG. 4 shows a series of nitrification reactors 18 and 19 separated by baffles. Floats 23 and 25 are attached to baffles 16 and 17 respectively. In operation, baffles 16 and 17 extend from the water level of pond 10 to the pond floor, thereby allowing wastewater to flow into chamber 14 only through opening 34 and out of chamber 14 only through opening 36.

There is a space between nitrification reactor 18 and its surrounding baffles 16 and 17. This allows water to flow about the sides of reactor 18. FIG. 4 clearly depicts mass material 22 floating at neutral buoyancy surrounded by water on all sides.

The actual biological oxidation of organic wastes takes place within reactor 18 each time both oxygen and water simultaneously come in contact with the surface area of mass material 22. Therefore, it is critical to circulate the water and oxygen upwards through mass material 22 and recirculate the water flow down around the sides of mass material 22.

A series of treatment chambers within a treatment pond steps down the amount of organic waste in the water at a higher rate than does one large treatment chamber. This is primarily due to the diffusion properties of the wastewater. Therefore, in the preferred embodiment, there are multiple chambers arranged side-by-side but separated by baffles such as baffles 16 and 17.

In operation, wastewater enters the left side of nitrification reactor chamber 14 through hole 34 in baffle 16. Aerator 24 forces both oxygen and wastewater up through mass material 22. This allows the organic waste in the water to attach itself to mass material 22 wherever both the wastewater and oxygen simultaneously come in contact with mass material 22. The wastewater circulates to the top of reactor chamber 14 and recirculates downward along the outside of mass material 22. This process repeats itself as the wastewater moves across chamber 14 towards chamber 15. FIG. 4 shows a typical pattern which a water molecule might travel through chamber 14. Within reactor chamber 14, the water can be moved up through mass material 22 up to hundreds of times before the water flow exits the right side of reactor chamber 14 through hole 36 in baffle 17 and enters reactor chamber 15 to undergo a similar procedure.

Figure 5:
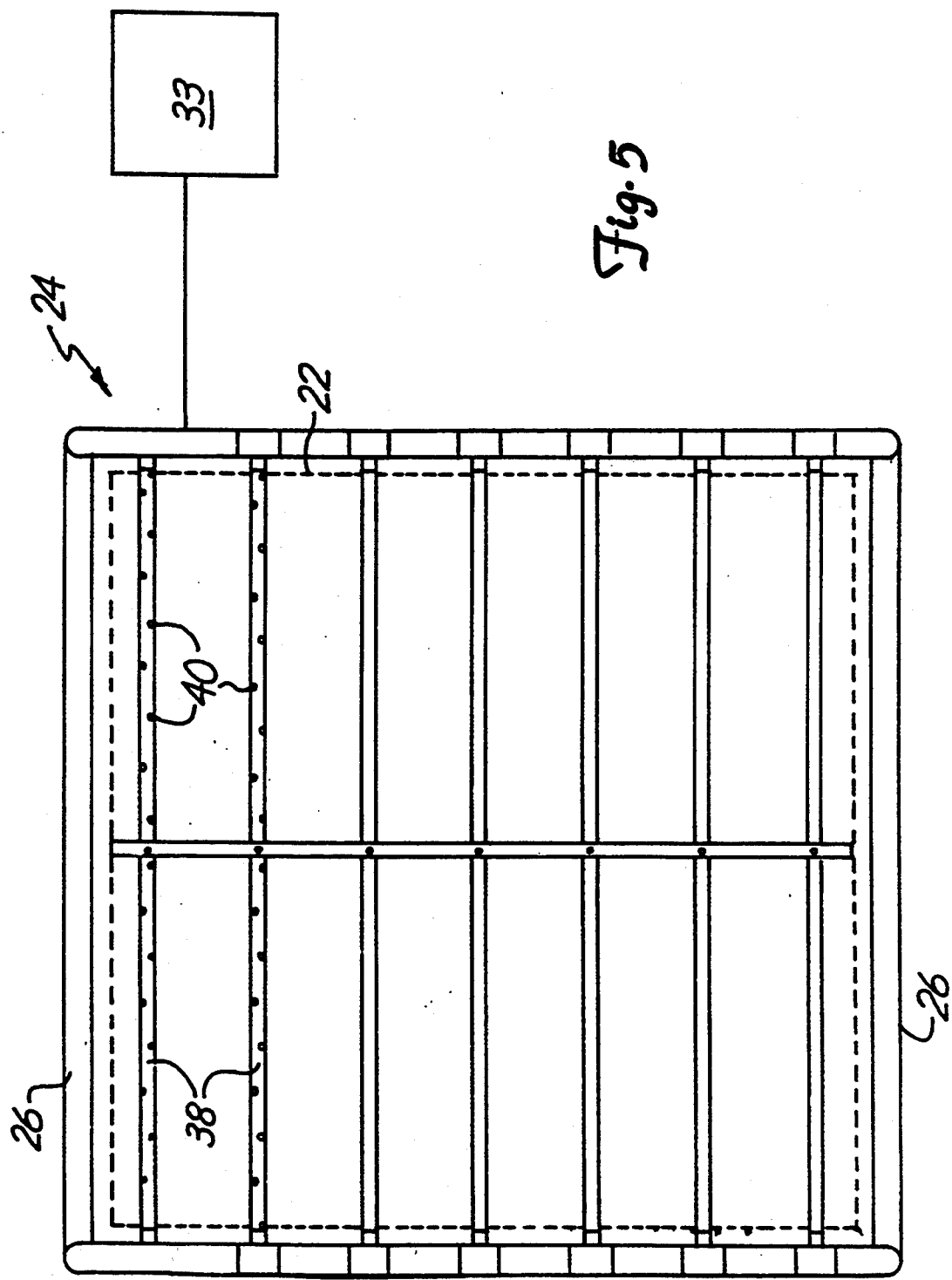
FIG. 5 is a top view of an aerator.

FIG. 5 is a top view of aerator 24 with mass material 22, represented by dashed lines, suspended above it. It is critical to have both the wastewater to be treated and oxygen reach as much of the surface area of mass material 22 as possible. Thus, a single jet of air flowing throughout mass material 22 is not highly effective for organic waste treatment. Rather, the present invention utilizes a series of tubes 38, wherein each tube has a series of staggered air holes 40. Air is forced into tubes 38 from air pump 33 and bubbles up through mass material 22 via holes 40. The design of FIG. 5 utilizes a greater portion of mass material 22 during the oxidation process as compared to the use of a single jet stream.

For proper and efficient biological oxidation of organic wastes, the air pressure forcing water through mass material 22 should be constant. The air pressure is directly related to the distance between aerator 24 and the water level of treatment pond 10. If aerator 24 is kept at a constant distance from the water level, a constant air pressure is maintained.

In FIG. 4, aerator 24 is suspended in treatment pond 10 at a constant level with respect to the water level of pond 10. Aerator 24 is suspended by aerator supports 26 and cables 30 which are connected to pipes 20 which, in turn, float along the surface of treatment pond 10. Therefore, aerator 24 remains at a constant level with respect to the water level and a constant air pressure is realized at the lower surface of mass material 22.

Figure 6:
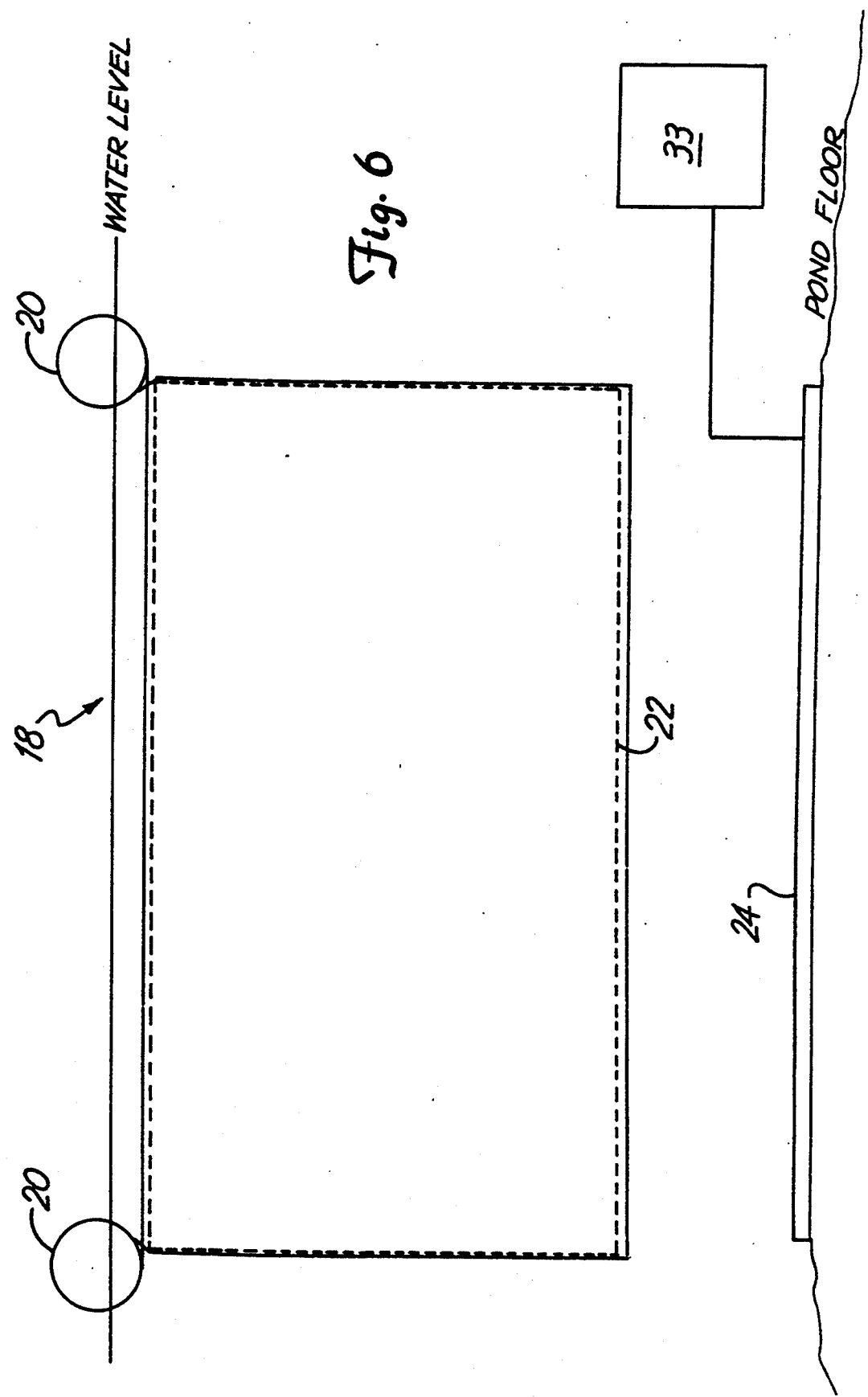
FIG. 6 is a front view of a nitrification reactor with a separated aerator.

In situations where the water level of pond 10 does not fluctuate to a large degree, aerator 24 can be situated on the pond floor with nitrification reactor 18 positioned above it as shown in FIG. 6. A constant air pressure is maintained in this situation since the distance between aerator 24 and the water level of pond 10 is substantially constant.

Figure 7:
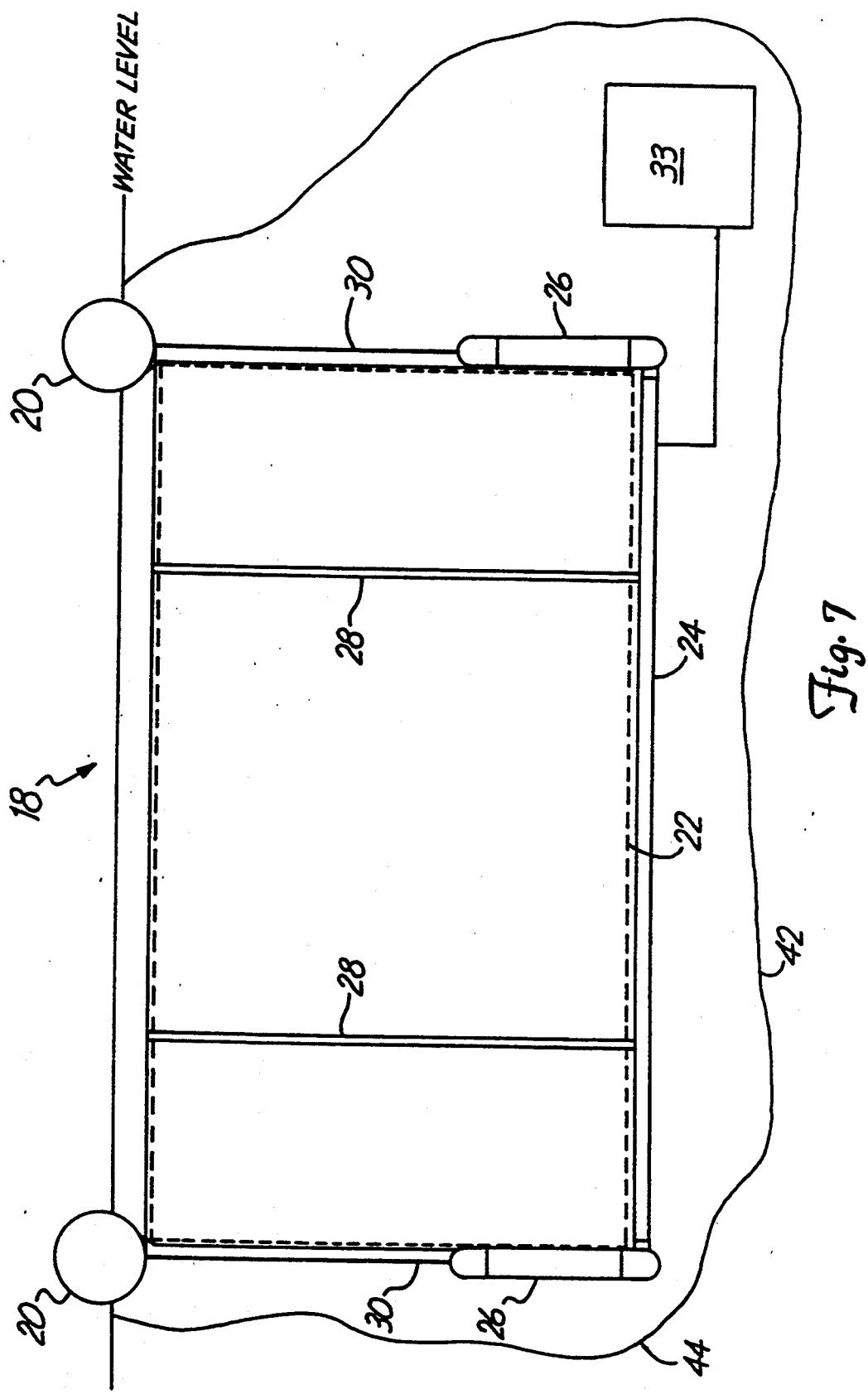
FIG. 7 is a front view of a nitrification reactor enclosed in a reactor bag.

FIG. 7 shows nitrification reactor 18 with aerator 24 connected. However, no baffles are utilized to isolate reactor 18 from the rest of the pond. Rather, reactor bag 42 encompasses reactor 18 and isolates it from the rest of pond 10. Reactor bag 42 prevents sludge located at the bottom of pond 10 from infiltrating the treatment process. Where necessary, reactor bag 42 is large enough to conform to the bottom of pond 10.

Wastewater is pumped into reactor bag 42 through hole 44. Bag 42 has seams which provide an exit for the wastewater. Bag 42 retains its shape as long as the amount of wastewater being pumped into reactor bag 42 is greater than the amount of wastewater exiting reactor bag 42 through its seams.

In another preferred embodiment, mass material 22 can be either a series of porous baffles or shredded recycled plastic within a cage-like unit. In still another preferred embodiment, baffles such as baffles 16 and 17 are porous baffles described in detail in U.S. Pat. No. 5,096,577, entitled "FLOATING AQUATIC PLANT WATER TREATMENT SYSTEM" assigned to the Lemna Corporation, who is also the assignee of the present application.

The floating nitrification reactor of the present invention addresses the problems of expense and efficiency of other reactors. Neither a separate nitrification building nor the continuous pumping of water to the top of reactor towers is necessary. Further, with the present invention, there is no need for a submerged tank in pond 10.

Although the present invention has been described with reference to preferred embodiments, workers skilled in the art will recognize that changes may be made in form and detail without departing from the spirit and scope of the invention.

What is claimed is:

1. A floating nitrification reactor for use in a treatment pond containing water, the reactor comprising:
   a mass of high surface area material for providing a plurality of sites for bacterial treatment of the water;
   floatation means attached to the mass of high surface area material for supporting the mass of high surface area material at neutral buoyancy;
   aerator means located a distance below the mass of high surface area material for forcing water through the mass of high surface area material; and
   partition means surrounding the mass of high surface area material for defining a partitioned zone for partitioning the mass of high surface area material from the rest of the treatment pond, the partition means defining an inlet and an outlet, wherein only water which enters through the inlet contacts the mass of high surface area material and wherein the inlet is sized to limit mixing between the water in the partitioned zone and water having higher nitrogen levels in the rest of the treatment pond and wherein the outlet is sized to limit the rate at which treated water exits through the outlet so that treated water recirculates through the mass of high surface area material without being diffused.

2. The reactor of claim 1, wherein the mass of high surface area material comprises:
   a trickle filter media.

3. The reactor of claim 1, wherein the mass of high surface area material comprises:
   a porous material.

4. The reactor of claim 1, wherein the mass of high surface area material comprises:
   shredded plastic.

5. The reactor of claim 1, wherein the floatation means comprises:
   a plurality of floatation devices positioned such that the mass of high surface area material floats completely submerged and suspended in the treatment pond to allow water to circulate from a bottom of the reactor to a top of the reactor through the mass of high surface area material.

6. The reactor of claim 1, wherein the partition means comprises:
   a floating system of baffles.

7. The reactor of claim 6, wherein an arrangement of pumps maintains water flow through the reactor.

8. The reactor of claim 1, wherein the partition means comprises:
   a fabric tank having walls encompassing a lower end of the mass of high surface area material.

9. The reactor of claim 1, wherein the partition means comprises:
   a reactor bag encompassing a lower end of the mass of high surface area material.

10. The reactor of claim 1, wherein the mass of high surface area material floats at neutral buoyancy and is spaced from the partition means to allow water above and below the mass of high surface area material and to provide for water recirculation from a top of the reactor to a bottom of the reactor along a plurality of sides of the mass of high surface area material.

11. The reactor of claim 1, wherein the aerator means is horizontally maintained below the mass of high surface area material for uniform dispersion of air bubbles at the high surface area material.

12. The reactor of claim 1, wherein the aerator means comprises a series of spaced tubes, each spaced tube having a series of evenly spaced holes to allow air bubbles to rise up through the mass of high surface area material.

13. A floating nitrification reactor for use in a treatment pond containing water to be treated, the reactor comprising:
    a mass of high surface area material for providing a plurality of sites for bacterial attachment;
    floatation means attached to the mass of high surface area material for floating the mass of high surface area material; and
    partition means surrounding the mass of high surface area material for defining a partitioned zone for partitioning the mass of high surface area material from the rest of the treatment pond, the partition means defining an inlet and an outlet, wherein only water which enters through the inlet contacts the mass of high surface area material and wherein the inlet is sized to limit mixing between the water in the partitioned zone and water having higher nitrogen levels in the rest of the treatment pond and wherein the outlet is sized to limit the rate at which treated water exits through the outlet so that treated water recirculates through the mass of high surface area material without being diffused.

14. The reactor of claim 13, wherein the mass of high surface area material comprises:
    a trickle filter media.

15. The reactor of claim 13, wherein the mass of high surface area material comprises:
    a porous material.

16. The reactor of claim 13, wherein the mass of high surface area material comprises:
    shredded plastic.

17. The reactor of claim 13, wherein the floatation means comprises:
    a floatation device positioned such that the mass of high surface area material floats with a portion of an upper surface of the high surface area material completely submerged in the treatment pond to allow water to circulate from a bottom of the reactor to a top of the reactor through the mass of high surface area material.

18. The reactor of claim 13, wherein the mass of high surface area material floats at neutral buoyancy and is spaced from the partition means to allow water above and below the mass of high surface area material and to provide for water recirculation from a top of the reactor to a bottom of the reactor along at least one side of the mass of high surface area material.

19. A floating nitrification reactor system for treating wastewater containing ammonia in a treatment pond, the reactor system comprising:
    a plurality of adjacent treatment chambers within the pond, each chamber defining a volume partitioned from the rest of the pond and including:
    a mass of high surface area material for providing a plurality of sites for bacterial attachment;

floatation means attached to the mass of high surface area material for floating the mass of high surface area material; and aerator means coupled to the mass of high surface area material and located a distance below the mass of high surface area material for forcing water through the mass of high surface area material; and partitioning walls defining the chamber and surrounding the mass of high surface area material, wherein the walls define an inlet and an outlet, the outlet of a first adjacent chamber communicating with the inlet of a second adjacent chamber so that only treated wastewater enters the second chamber, the inlet being sized to substantially limit mixing of wastewater between the first adjacent chamber and the second adjacent chamber so that the amount of ammonia in the wastewater is stepped down as the wastewater is treated in the treatment chambers.

20. The reactor of claim 19, wherein the mass of high surface area material comprises:
a trickle filter media.

21. The reactor of claim 19, wherein the mass of high surface area material comprises:
a porous material.

22. The reactor of claim 19, wherein the mass of high surface area material comprises:
shredded plastic.

23. The reactor of claim 19, wherein the floatation means comprises:
a plurality of floatation devices positioned such that the mass of high surface area material floats substantially completely submerged and suspended in the treatment pond to allow water to circulate from a bottom of the reactor to a top of the reactor through the mass of high surface area material.

24. The reactor of claim 19, wherein the mass of high surface area material floats at neutral buoyancy to allow water above and below the mass of high surface area material to provide for water recirculation from a top of the reactor to a bottom of the reactor along a plurality of sides of the mass of high surface area material.

25. A wastewater treatment system for use in a body of water containing wastewater to be treated, comprising:

a mass of high surface area material within the body of water for providing a plurality of sites for bacterial treatment;

support members attached to the mass of high surface area material for floating the mass of high surface area material at neutral buoyancy suspended substantially entirely beneath the surface of the wastewater;

aerator means located a distance below the mass of high surface area material for forcing water through the mass of high surface area material at a sufficient speed to allow treatment; and partitioning walls spaced from and surrounding the support members and the mass of high surface area material for separating treated wastewater within the walls from untreated wastewater outside the walls and for allowing treated wastewater to recirculate between the support members and the partitioning walls, wherein the walls define a treatment chamber having an inlet and an outlet, the inlet sized to limit mixing between the wastewater within the treatment chamber and wastewater outside the treatment chamber to limit diffusion of treated wastewater within the chamber.

* * * * *